(12) United States Patent
Munro et al.

(10) Patent No.: US 11,926,444 B2
(45) Date of Patent: Mar. 12, 2024

(54) MODULAR UNMANNED AERIAL VEHICLES

(71) Applicant: Insitu, Inc., a subsidiary of The Boeing Company, Bingen, WA (US)

(72) Inventors: Bryan G. Munro, Seattle, WA (US); Danny R. Nalley, Olympia, WA (US); Joel M. Reiter, Seattle, WA (US); Harold A. Brown, Seattle, WA (US); Ovidiu C. Mihai, Sammamish, WA (US)

(73) Assignee: Insitu, Inc., Bingen, WA (US)

( * ) Notice: Subject to any disclaimer, the term of this patent is extended or adjusted under 35 U.S.C. 154(b) by 138 days.

(21) Appl. No.: 17/459,698

(22) Filed: Aug. 27, 2021

(65) Prior Publication Data

US 2022/0119107 A1    Apr. 21, 2022

Related U.S. Application Data

(60) Provisional application No. 63/092,284, filed on Oct. 15, 2020.

(51) Int. Cl.
| | |
|---|---|
| *B64U 20/40* | (2023.01) |
| *B64C 1/26* | (2006.01) |
| *B64U 30/14* | (2023.01) |
| *B64U 30/292* | (2023.01) |
| *B64C 39/02* | (2023.01) |

(Continued)

(52) U.S. Cl.
CPC .............. *B64U 20/40* (2023.01); *B64C 1/26* (2013.01); *B64U 30/14* (2023.01); *B64U 30/292* (2023.01); *B64C 39/024* (2013.01); *B64C 2211/00* (2013.01); *B64U 10/10* (2023.01);

(Continued)

(58) Field of Classification Search
CPC .......... B64C 1/26; B64U 20/40; B64U 30/14; B64U 30/292
See application file for complete search history.

(56) References Cited

U.S. PATENT DOCUMENTS 5,941,478 A * 8/1999 Schmittle ............. B64C 39/024
                                                              244/131
11,724,801 B2 * 8/2023 Baity ................. B64C 29/0033
                                                              244/6

(Continued)

FOREIGN PATENT DOCUMENTS

| | | |
|---|---|---|
| DE | 2642550 B1 * | 2/1978 |
| WO | 2014025617 A1 | 2/2014 |
| WO | 2018208652 A1 | 11/2018 |

OTHER PUBLICATIONS

European Patent Office, Extended European Search Report, issued in connection with Application No. 21192529.2, dated Feb. 4, 2022, 11 pages.

*Primary Examiner* — Jessica B Wong
(74) *Attorney, Agent, or Firm* — HANLEY, FLIGHT & ZIMMERMAN, LLC

(57) ABSTRACT

Modular unmanned aerial vehicles (UAVs) are disclosed. A disclosed example UAV includes a fuselage that extends along a longitudinal axis, a wing support frame extending from the fuselage and along a wingspan of the UAV. The wing support frame includes distal ends to support a releasably couplable wing, the releasably couplable wing to extend along the wingspan when coupled to the wing support frame, and a motor boom that extends parallel to the longitudinal axis, the motor boom to support a motor that is oriented to generate lift for the UAV.

22 Claims, 7 Drawing Sheets

(51) Int. Cl.
 B64U 10/10 (2023.01)
 B64U 10/25 (2023.01)
 B64U 30/10 (2023.01)
 B64U 30/20 (2023.01)
 B64U 50/13 (2023.01)

(52) U.S. Cl.
 CPC .............. *B64U 10/25* (2023.01); *B64U 30/10* (2023.01); *B64U 30/20* (2023.01); *B64U 50/13* (2023.01)

(56) References Cited

U.S. PATENT DOCUMENTS

| | | | | |
|---|---|---|---|---|
| 2007/0102575 A1* | 5/2007 | Morgan | .................... | B64C 5/02 244/87 |
| 2012/0267473 A1* | 10/2012 | Tao | .......................... | B64C 3/56 244/46 |
| 2013/0206915 A1* | 8/2013 | Desaulniers | ............ | B64C 29/00 244/165 |
| 2015/0136897 A1 | 5/2015 | Seibel et al. | | |
| 2016/0114887 A1* | 4/2016 | Zhou | ...................... | H04N 7/181 348/148 |
| 2018/0086458 A1 | 3/2018 | Sartorius et al. | | |
| 2018/0155021 A1 | 6/2018 | Patterson et al. | | |
| 2018/0370629 A1* | 12/2018 | Finlay | ................ | B64C 29/0033 |
| 2019/0077497 A1* | 3/2019 | Uhlig | .................... | B64C 39/04 |
| 2019/0100303 A1* | 4/2019 | Campbell | ................ | B64C 27/26 |
| 2019/0100313 A1* | 4/2019 | Campbell | ........... | B64C 29/0033 |
| 2019/0165346 A1* | 5/2019 | Wallace | ................ | B64D 27/00 |
| 2019/0168872 A1 | 6/2019 | Grubb et al. | | |
| 2020/0274386 A1* | 8/2020 | Kirleis | ................. | H02J 7/0029 |
| 2021/0053670 A1* | 2/2021 | Landry | .................. | B64U 10/25 |
| 2021/0197965 A1* | 7/2021 | Kunz | ..................... | B64C 39/04 |
| 2021/0339860 A1* | 11/2021 | Agostino | ................ | B64C 5/02 |

\* cited by examiner

MODULAR UNMANNED AERIAL VEHICLES

RELATED APPLICATION

This patent claims the benefit under 35 U.S.C. § 119(e) to U.S. Provisional Application No. 63/092,284, titled "Modular Unmanned Aerial Vehicles," and filed on Oct. 15, 2021. U.S. Provisional Application No. 63/092,284 is hereby incorporated by this reference in its entirety.

FIELD OF THE DISCLOSURE

This disclosure relates generally to aircraft and, more particularly, to modular unmanned aerial vehicles.

BACKGROUND

In recent years, unmanned aerial vehicles (UAVs) or drones have been used to fly significant distances to transport payloads (e.g., packages, supplies, equipment, etc.) or gather information. A weight and an aerodynamic design of a UAV can affect a payload that can be carried by the UAV, as well as a flight range of the UAV. Typically, UAVs are designed for specific performance and/or mission needs.

SUMMARY

An example unmanned aerial vehicle (UAV) includes a fuselage that extends along a longitudinal axis, a wing support frame extending from the fuselage and along a wingspan of the UAV. The wing support frame includes distal ends to support: (i) a releasably couplable wing, the releasably couplable wing to extend along the wingspan when coupled to the wing support frame, and (ii) a motor boom that extends parallel to the longitudinal axis, the motor boom to support a motor that is oriented to generate lift for the UAV.

An example method includes coupling a fuselage that extends along a longitudinal axis to a wing support frame, the wing frame support extending from the fuselage and along a wingspan of a UAV, and releasably coupling a wing to a distal end of the wing support frame, the wing to be releasably coupled to the wing frame support at the distal end, the distal end to support a motor boom that is parallel to the longitudinal axis.

Figure 1:
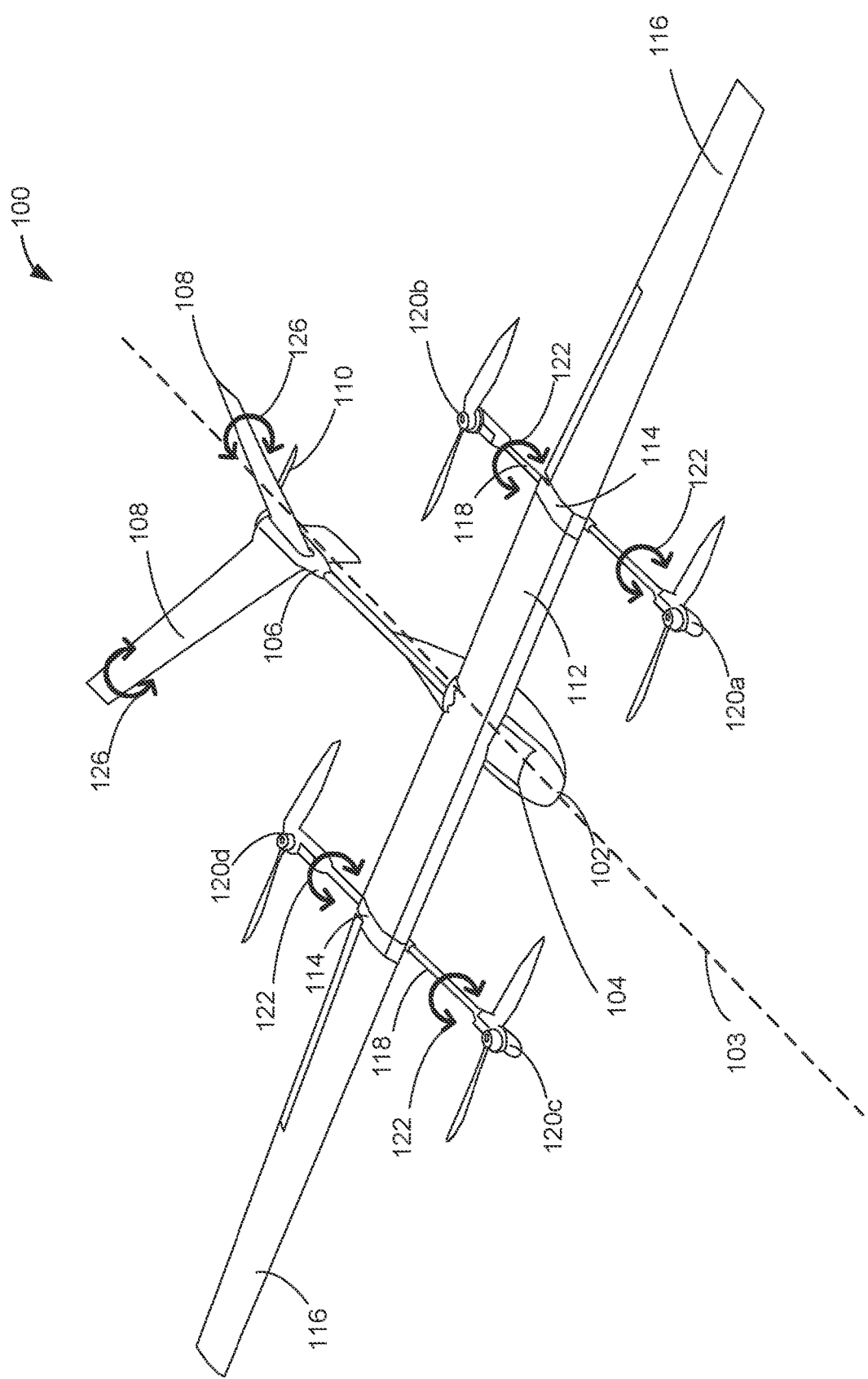
FIG. 1 is an example unmanned aerial vehicle (UAV) in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Modular unmanned aerial vehicles (UAVs) are disclosed. Some known UAVs have a limited flight range based on weight (e.g., structural weight, fuel carried, payload, etc.), as well as aerodynamic design. Further, to save on weight, known UAVs are not generally customizable or adaptable due to additional structures or weight corresponding to such customizability. In other words, most known UAVs are designed for specific application needs (e.g., mission needs, payload requirements, etc.) and many different UAVs are usually purchased, utilized and maintained to meet varying application needs.

Examples disclosed herein enable UAVs that are lightweight, highly maneuverable, highly adaptable and relatively low cost. Examples disclosed herein are modular to enable different components to be replaced and/or swapped for different applications, thereby enabling the UAVs to be versatile for different applications.

Examples disclosed herein include a UAV having a fuselage that extends along a longitudinal axis. A wing support frame or strongback extends from the fuselage and along a wingspan of the UAV. The wing support frame has distal ends to support a releasably couplable wing and a motor boom that extends parallel to the longitudinal axis (e.g., within 5 degrees of the longitudinal axis).

In some examples, the wingspan is approximately 4.85 to 5.05 meters (m). In some examples, the UAV includes a releasably couplable tail boom. In some examples, the tail boom supports a combined rudder-elevator that can swivel relative to a the tail boom. In some examples, the combined rudder-elevator is releasably couplable to the tail boom. In some examples, the motor boom is at least partially composed of carbon fiber. Additionally or alternatively, the motor boom is releasably couplable to the wing support frame. In some examples, the motor boom mounts a first motor and a second motor on an opposite side of the wing support frame and/or the wing.

As used herein, the term "releasably couplable" refers to an object that is intended to be coupled and released through numerous cycles with relatively little or no plastic deformation. Accordingly, the term "releasably couplable" can refer to a snap fit, a slip fit, a magnetic connection, a lock interface (e.g., a spring-loaded pin, a lever lock, etc.).

FIG. 1 is an example UAV 100 in accordance with teachings of this disclosure. The UAV 100 is modular and adaptable to enable adjustments that can allow customization associated with different performance requirements. In particular, different components of the UAV 100 can be easily swapped to vary functionality of the UAV 100. Thus, the UAV 100 can be adapted for a wide range of application and/or flight needs.

The UAV 100 of the illustrated example includes a fuselage 102, which carries fuel and at least one payload. The fuselage 102 defines a longitudinal axis 103 and includes a controller 104. Further, the example fuselage 102 is operatively coupled to a tail boom 106 that supports rudder-elevators (e.g., a combined rudder and elevator, a combined rudder-elevator, etc.) 108, which are also known as ruddervators, and a tail motor 110. In the illustrated example, the fuselage 102 is coupled to a strongback or wing support frame 112 having respective distal ends 114. In this example, the distal ends 114 support releasably couplable wings 116, as well as booms (e.g., motor booms, wing booms, etc.) 118 that, in turn, support motors 120 (hereinafter the motors 120a, 120b, 120c, 120d, etc.). In this example, the booms 118 extend generally parallel (e.g., within five degrees) to the aforementioned longitudinal axis 103 and do not support batteries and/or a power source for the motors 120a, 120b, 120c, 120d. In other examples, the booms 118 are angled from the longitudinal axis 103 (e.g., 10 to 15 degrees from the longitudinal axis 103). Further, each of the booms 118 supports ones of the motors 120 at opposite sides of the strongback 112 and/or the corresponding wing(s) 116.

To move the UAV 100, the tail motor 110 of the illustrated example is controlled to propel the UAV 100 forward. Further, the motors 120a, 120b, 120c, 120d are operated to vary a lift of the UAV 100 during flight. For example, at least one of the motors 120a, 120b, 120c, 120d is operated to maneuver the UAV 100. In some examples, the motors 120a, 120b, 120c, 120d are utilized for hovering. Additionally or alternatively, the motors 120a, 120b, 120c, 120d are utilized for vertical takeoff, such as vertical take-off and landing (VTOL) or short take-off and landing (STOL) functionality.

To increase a maneuverability of the example UAV 100, the rudder-elevators 108 can be rotated, as generally indicated by double arrows 126, for example. Additionally or alternatively, an orientation of at least one of the motors 120a, 120b, 120c, 120d can be adjusted, as generally indicated by double arrows 122. In particular, in some such examples, the motors 120a, 120b, 120c, 120d are swiveled during flight of the UAV 100.

To increase a range and fuel efficiency of the UAV 100, a wingspan of the UAV 100 can range from 4.85 m to 5.05 m (e.g., 4.95 m in length). In this example, the wingspan is defined as a distance between distal outer ends of the wings 116 and, thus, can include a width of the strongback 112. Further, a length of the fuselage can range from 2.03 m to 2.23 m (e.g., 2.13 m). These example dimensions can be advantageous in operating the UAV 100 in terms of fuel efficiency and range.

To enable the UAV 100 to be adaptable and/or modular, the wings 116 are releasably couplable to the strongback 112. In particular, the wings 116 can be exchanged, replaced and/or swapped for wings that are better suited for another application and/or mission requirement. For example, the wings 116 can be swapped with a shorter wing (i.e., a decreased wingspan) for faster flight or a longer wing (i.e., an increased wingspan) for gliding, thereby enabling a great degree of versatility of the UAV 100. In other words, different wings can be selected for different functions and/or performance requirements. As a result of this flexibility, an operator may purchase and maintain a reduced number of operational UAVs, thereby saving expenses and costs associated with a large fleet of UAVs. Moreover, the replaceability of the wings 116 enables a damaged wing to be replaced and, thus, increases a service life of the UAV 100. In some examples, the strongback 112 is releasably couplable to the fuselage 102. Further, the rudder-elevators 108 are releasably couplable to the fuselage 102 and/or the tail boom 106.

In some examples, the booms 118 are at least partially composed of carbon fiber. Additionally or alternatively, the wings 116, the fuselage 102, the strongback 112, the tail boom 106 and/or the rudder-elevators 108 are at least partially composed of carbon fiber. In some examples, the booms 118 are rotatable (e.g., rotatable along an axis parallel to the longitudinal axis 103).

The example UAV 100 can weigh less than 90 kilograms (kg). Further, the UAV 100 can have a hover duration of approximately 90 seconds and a sortie duration of approximately 4 hours. The example UAV 100 also includes an airframe mass of approximately 19.5 kg and can carry a payload weight of approximately 2 kg. Further, the example UAV 100 has a maximum speed of 54 knots (kn) and can withstand wind speeds of approximately 25 kn.

Figure 2:
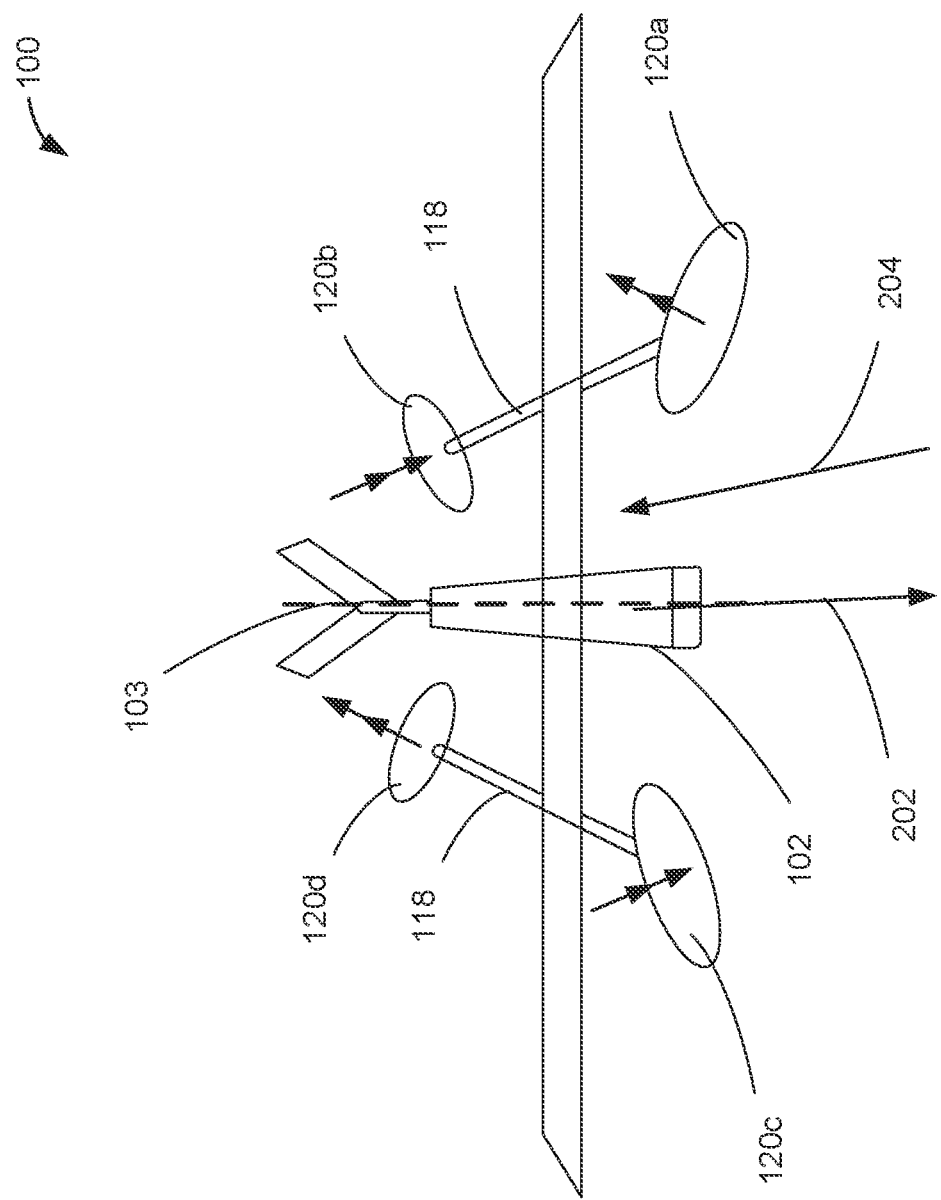
FIG. 2 depicts an example rotor configuration that can be implemented in examples disclosed herein.

FIG. 2 depicts an example rotor configuration that can be implemented in examples disclosed herein. As can be seen in the illustrated example of FIG. 2, the UAV 100 is shown with the motors 120a, 120b, 120c, 120d being simultaneously operated (e.g., operated at independent speeds and/or rotational orientations). In this example, an arrow 202 depicts a direction of flight while an arrow 204 depicts a direction of air flow.

In operation, the motors 120a and 120d move the UAV 100 forward while the motors 120b and 120c move the UAV 100 backward. In this example, the motors 120a and 120d are angled upward from the ground while the motors 120b and 120c are angled downward toward the ground.

In some examples, the motors 120a, 120b, 120c, 120d can be swiveled and/or re-oriented during flight or hover of the UAV 100 (e.g., the motors 120a, 120b, 120c, 120d are rotated via an actuator, motor and/or solenoid). This movement of the motors 120a, 120b, 120c, 120d can enable increase lateral movement and/or turning of the UAV 100. Additionally or alternatively, the booms 118 can be swiveled and/or rotated relative to the fuselage 102 and/or the wings 116. Further, the motors 120a, 120b, 120c, 120d can be operated speeds different from one another to enhance maneuverability of the UAV 100.

While four of the motors 120 are shown in connection with the UAV 100, any appropriate number of the motors 120 can be implemented instead (e.g., six, ten, twenty, one hundred, etc.).

Figure 3:
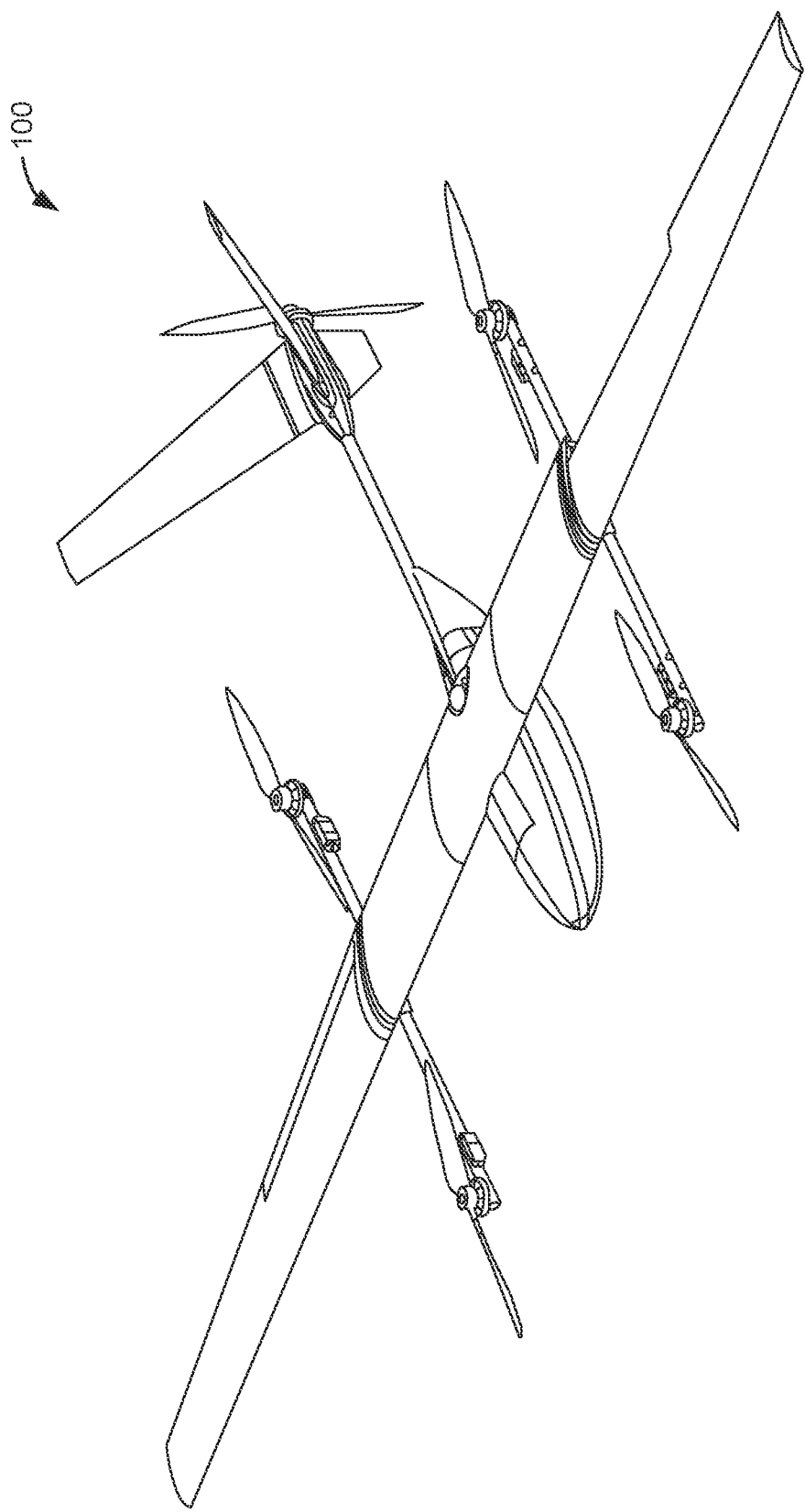
FIG. 3 is a perspective view of the example UAV of FIGS. 1 and 2.

FIG. 3 is a perspective view of the example UAV 100 of FIGS. 1 and 2.

Figure 4:
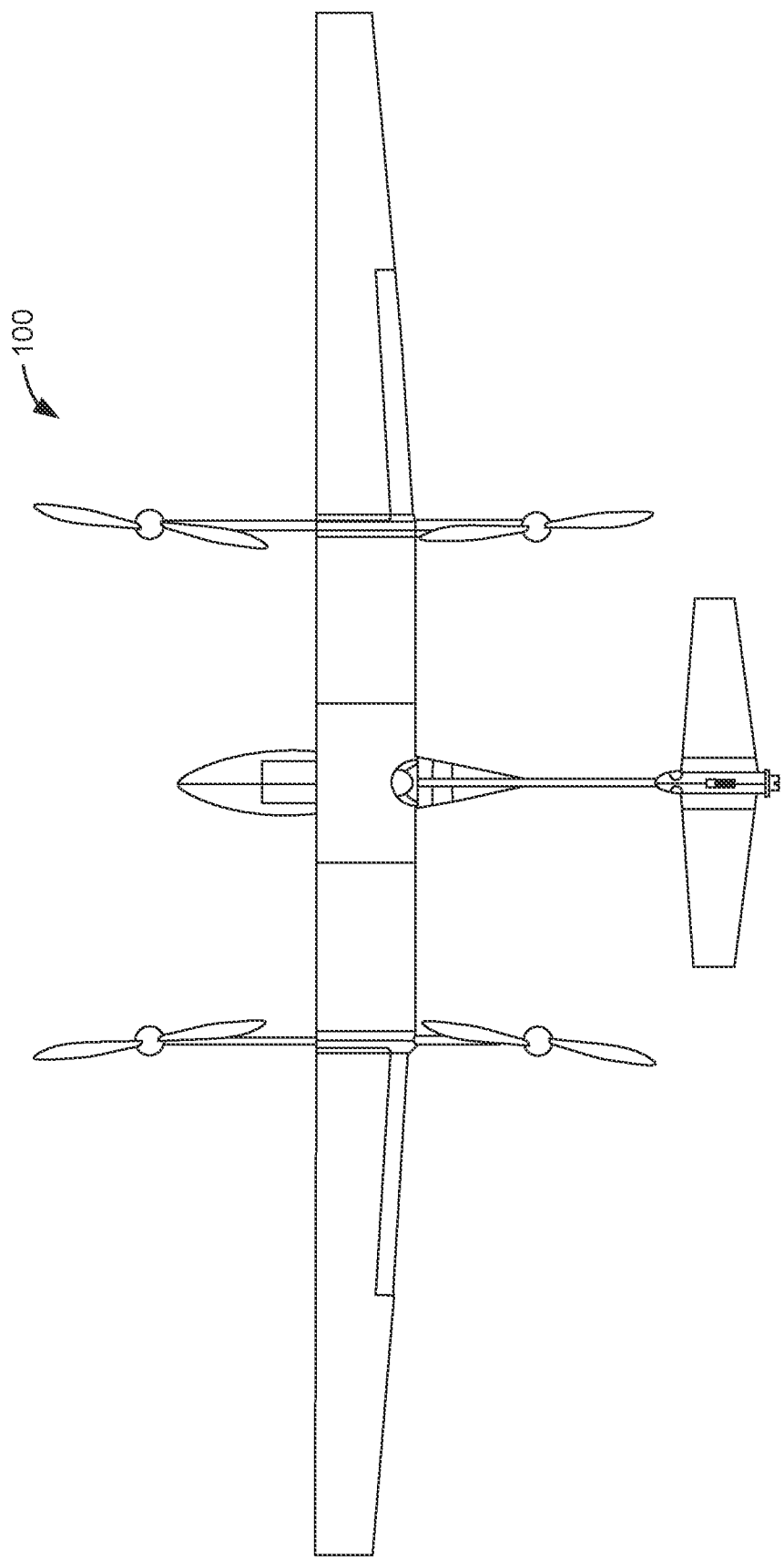
FIG. 4 is a top view of the example UAV of FIGS. 1-3.

FIG. 4 is a top view of the example UAV 100 of FIGS. 1-3. In some examples, the example UAV 100 has a wingspan of approximately 4.940 m.

Figure 5:
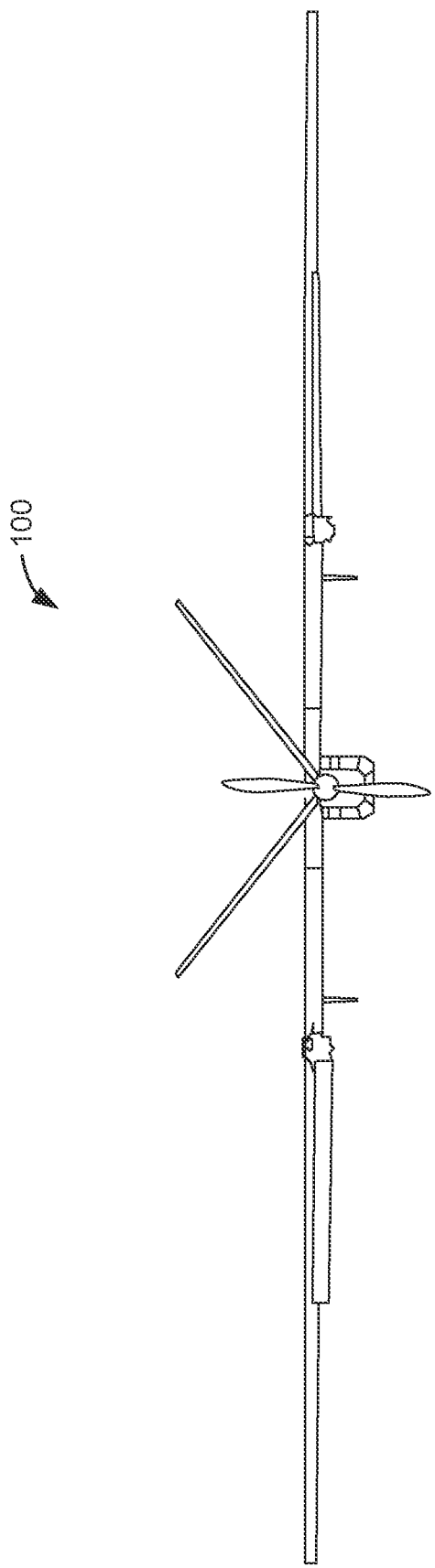
FIG. 5 is a rear view of the example UAV of FIGS. 1-4.

FIG. 5 is a rear view of the example UAV 100 of FIGS. 1-4. In some examples, the height the UAV 100 is approximately 0.622 m.

Figure 6:
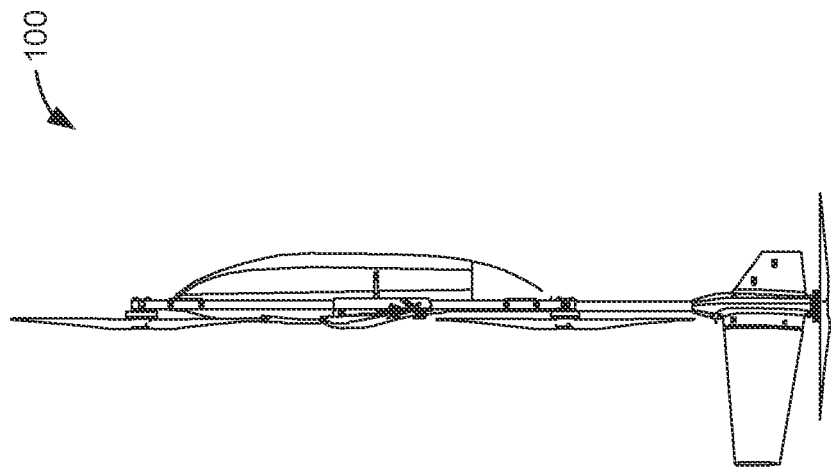
FIG. 6 is a side view of the example UAV of FIGS. 1-5.

FIG. 6 is a side view of the example UAV 100 of FIGS. 1-5. In some examples, a length of the UAV 100 is approximately 2.03850 m.

Figure 7:
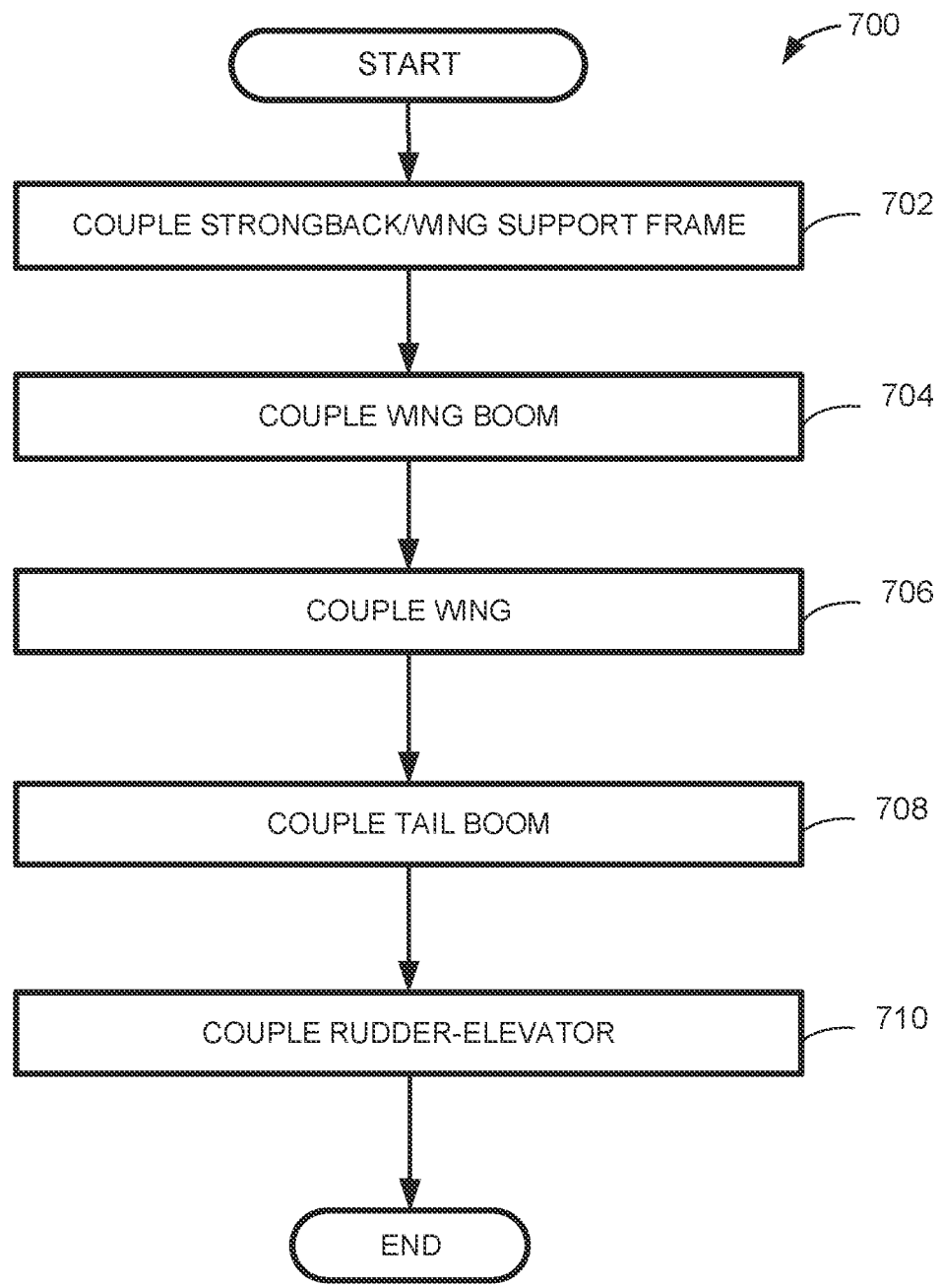
FIG. 7 is a flowchart representative of an example method to implement the example UAV of FIGS. 1-6.

FIG. 7 is a flowchart representative of an example method 700 to implement the example UAV 100 of FIGS. 1-6. In this example, the UAV 100 is being assembled and/or prepared for flight. In particular, the UAV 100 has been previously disassembled to facilitate shipping. Now that the UAV 100 has been shipped, the UAV 100 will be configured to perform a mission.

At block 702, the strongback/wing support frame 112 is coupled to the fuselage 102. In some examples, the strongback 112 is releasably coupled to the fuselage 102. In other examples, the strongback 112 is bonded, adhered and/or welded to the fuselage 102.

At block 704, in some examples, the wing boom 118 is coupled to the strongback 112. In this example, the boom 118 is releasably coupled to the strongback 112. In other examples, the boom 118 is integral (e.g., pre-assembled) to the strongback 112.

At block 706, the wing 116 is coupled to the distal end 114 of the strongback 112. In this example, the strongback 112 defines at least a portion of a wingspan of the UAV 100. In some examples, the wing 116 is replaced with another wing based on a performance and/or mission requirement(s).

At block 708, the tail boom 106 is coupled to the fuselage 102. In some examples, the tail boom is releasably coupled to the fuselage 102. In other examples, the tail boom 106 is foldable relative to the fuselage 102.

At block 710, the rudder-elevator 108 is coupled to the tail boom 106 and/or the fuselage 102 and the method 700 ends. In this example, the rudder-elevator 108 is releasably couplable to the tail boom 106 and/or a frame associated with the tail boom 106 via a slip fit. In some examples, a lock pin (e.g., a spring-loaded lock pin) is implemented to retain or hold the rudder-elevator 108 to the tail boom 106.

Example 1 includes an example unmanned aerial vehicle (UAV) including a fuselage that extends along a longitudinal axis, a wing support frame extending from the fuselage and along a wingspan of the UAV. The wing support frame includes distal ends to support a releasably couplable wing, the releasably couplable wing to extend along the wingspan when coupled to the wing support frame, and a motor boom that extends parallel to the longitudinal axis, the motor boom to support a motor that is oriented to generate lift for the UAV.

Example 2 includes the UAV as defined in example 1, further including a releasably couplable tail boom.

Example 3 includes the UAV as defined in example 2, wherein the tail boom supports a combined rudder-elevator.

Example 4 includes the UAV as defined in example 3, wherein the combined rudder-elevator swivels relative to the tail boom.

Example 5 includes the UAV as defined in any of examples 3 or 4, wherein the combined rudder-elevator is releasably couplable to the tail boom.

Example 6 includes the UAV as defined in any of examples 1 to 5, wherein the UAV includes a wingspan of approximately 4.85 to 5.05 meters.

Example 7 includes the UAV as defined in any of examples example 1 to 6, wherein the motor boom is releasably couplable to the wing support frame.

Example 8 includes the UAV as defined in any of examples 1 to 7, wherein the motor boom is integral with the wing support frame.

Example 9 includes the UAV as defined in any of examples 1 to 8, wherein the motor is a first a motor, and wherein the motor boom supports a second motor on an opposite side of the wing support frame from the first motor.

Example 10 includes the UAV as defined in example 9, wherein the first motor is oriented in a direction opposing an orientation of the second motor.

Example 11 includes the UAV as defined in any of examples 9 or 10, wherein the first motor is directed downward toward the ground and the second motor is directed upward away from the ground.

Example 12 include a method including coupling a fuselage that extends along a longitudinal axis to a wing support frame, the wing frame support extending from the fuselage and along a wingspan of an unmanned aerial vehicle (UAV), and coupling a wing to a distal end of the wing support frame, the wing to be releasably coupled to the wing frame support at the distal end, the distal end to support a motor boom that is parallel to the longitudinal axis.

Example 13 includes the method as defined in example 12, further including coupling the motor boom to the wing frame support.

Example 14 includes the method as defined in any of examples 12 or 13, further including coupling a tail boom to the fuselage.

Example 15 includes the method as defined in any of examples 12 to 14, further including coupling a combined rudder/elevator to the fuselage.

Example 16 includes the method as defined in example 15, wherein coupling the combined rudder/elevator to the fuselage includes a slip fit.

Example 17 includes the method as defined in any of examples 15 or 16, wherein coupling the combined rudder/elevator to the fuselage includes use of a spring-loaded pin.

Example 18 includes the method as defined in any of examples 12 to 17, further including orienting a first motor of a motor boom coupled to the distal end of the distal frame support toward the ground, and orienting a second motor of the motor boom away from the ground.

Example 19 includes the method as defined in any of examples 12 to 18, wherein the wing includes a first wing that corresponds to a first performance requirement, and further including exchanging the first wing with a second wing that corresponds to a second performance requirement different from the first performance requirement.

Example 20 includes the method as defined in any of examples 12 to 19, wherein the fuselage is releasably coupled to the wing support frame.

From the foregoing, it will be appreciated that example methods, apparatus and articles of manufacture have been disclosed that enable a highly adaptable UAV that is light weight, cost-effective and fuel efficient. Examples disclosed herein enable UAVs to be adapted for different performance and/or mission requirements, thereby reducing a need to purchase, maintain and store many different types of UAVs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aerial vehicle (AV) comprising: a fuselage that extends along a longitudinal axis; a removable portion of a wing; a motor boom extending from the wing, the motor boom extending along a direction parallel to the longitudinal axis, the motor boom rotatable about an axis of rotation extending along the direction to move forward, first and second motors positioned thereon, the first and second motors on opposing distal ends of the motor boom, the first motor positioned at a fore position of the wing, the second motor positioned at an aft position of the wing; and a wing support frame extending from the fuselage and partially defining a fixed portion of the wing, the wing support frame having distal ends to support: the removable portion of the wing, and the motor boom.

2. The AV as defined in claim 1, further including a releasably couplable tail boom.

3. The AV as defined in claim 2, wherein the releasably couplable tail boom supports a combined rudder-elevator.

4. The AV as defined in claim 3, wherein the combined rudder-elevator swivels relative to the releasably couplable tail boom.

5. The AV as defined in claim 3, wherein the combined rudder-elevator is releasably couplable to the releasably couplable tail boom.

6. The AV as defined in claim 1, wherein a wingspan corresponding to the AV includes a length of approximately 4.85 to 5.05 meters.

7. The AV as defined in claim 1, wherein the motor boom is releasably couplable to the wing support frame.

8. The AV as defined in claim 1, wherein the motor boom is integral with the wing support frame.

9. The AV as defined in claim 1, wherein the first motor is oriented in an opposed direction relative to a position of the second motor.

10. The AV as defined in claim 1, wherein the first motor is directed downward toward the ground and the second motor is directed upward away from the ground.

11. A method comprising: coupling a fuselage that extends along a longitudinal axis to a wing support frame, the wing support frame extending from the fuselage and along a wingspan of an aerial vehicle (AV), the wing support frame partially defining a fixed portion of a wing; and coupling a removable portion of the wing to a distal end of the wing support frame, the removable portion of the wing to be releasably coupled to the wing support frame at the distal end, the distal end to support a motor boom that extends along a direction parallel to the longitudinal axis, the motor boom positioned on the wing and rotatable about an axis of rotation parallel to the direction of forward flight, the motor boom supporting first and second motors on opposing distal ends thereof, the first motor positioned at a fore position of the wing, the second motor positioned at an aft position of the wing.

12. The method as defined in claim 11, further including coupling the motor boom to the wing support frame.

13. The method as defined in claim 11, further including coupling a tail boom to the fuselage.

14. The method as defined in claim 11, further including coupling a combined rudder/elevator to the fuselage.

15. The method as defined in claim 14, wherein coupling the combined rudder/elevator to the fuselage includes a slip fit.

16. The method as defined in claim 14, wherein coupling the combined rudder/elevator to the fuselage includes use of a spring-loaded pin.

17. The method as defined in claim 11, further including orienting the first motor of the motor boom toward the ground, and orienting the second motor of the motor boom away from the ground.

18. The method as defined in claim 11, wherein the wing includes a first wing that corresponds to a first performance requirement, and further including exchanging the first wing with a second wing that corresponds to a second performance requirement different from the first performance requirement.

19. The method as defined in claim 11, wherein the fuselage is releasably coupled to the wing support frame.

20. The AV as defined in claim 1, wherein the first motor is oriented about the motor boom in a first orientation that is different from a second orientation of the second motor.

21. The AV as defined in claim 1, wherein the first and second motors are independently rotatable relative to the motor boom.

22. The AV as defined in claim 2, wherein the releasably couplable tail boom is releasably couplable to the fuselage.

* * * * *